United States Patent [19]

Kool et al.

[11] 4,204,753
[45] May 27, 1980

[54] ROTARY FILM STRIP HOLDING APPARATUS

[75] Inventors: Bram Kool, Saratoga; Janusz Warszawski; Jules G. Moritz, both of Los Altos, all of Calif.

[73] Assignee: Microform Data Systems, Inc., Mountain View, Calif.

[21] Appl. No.: 929,392

[22] Filed: Jul. 31, 1978

[51] Int. Cl.² .................. G03B 23/08; G03B 23/12
[52] U.S. Cl. .................. 353/26 R; 353/117; 353/27 R; 353/121
[58] Field of Search ............. 353/25 R, 27 R, 27 A, 353/103, 114, 117, 118, 120, 121, 108, 110, 122; 40/378; 206/455; 209/909, 608

[56] References Cited

U.S. PATENT DOCUMENTS

| | | | |
|---|---|---|---|
| 1,371,871 | 3/1921 | Dietz | 353/118 |
| 3,458,253 | 7/1969 | Hansen | 353/117 X |
| 3,743,400 | 7/1973 | Haning et al. | 353/27 A X |
| 3,800,942 | 4/1974 | Hirata et al. | 353/25 X |
| 3,822,937 | 7/1974 | Kroeger | 353/117 X |
| 3,920,324 | 11/1975 | Otto | 353/117 |
| 4,059,352 | 11/1977 | Bar et al. | 353/117 X |

*Primary Examiner*—Harry N. Haroian
*Attorney, Agent, or Firm*—John L. McGannon

[57] ABSTRACT

Apparatus for holding film strips of the type having a plurality of miniaturized film images carried thereon, wherein the apparatus is to be used with an optical system which illuminates and projects the images on an enlarged scale so that they can be viewed on a projection screen. The apparatus includes a rotary film holder or cassette having a number of concentric cylindrical segments defining a pair of coaxial cylinders, the segments being provided with grooves to permit insertion of a plurality of film strips in the cassette. The inner segments are longer than the outer segments so that portions of the radially outermost edges of the film strips are exposed and the outer edge of a selected film strip can be engaged by an edge drive wheel to permit the selected film strip to be moved partially out of and to be returned to the cassette. The cassette is rotatably mounted by spaced bearings on a projection carried by a stationary support, and a drive wheel coupled to a reversible motor engages the outer periphery of the cassette to rotate it in opposed directions. An optical system on the support is used with an X-Y drive to project an image on the selected film strip onto a screen when the film strip is releasably held in a predetermined focal plane by hold-down means. Control structure coupled with the drive motors of the cassette, the edge drive wheel and the X-Y drive controls such motors to effect operation of the apparatus.

16 Claims, 14 Drawing Figures

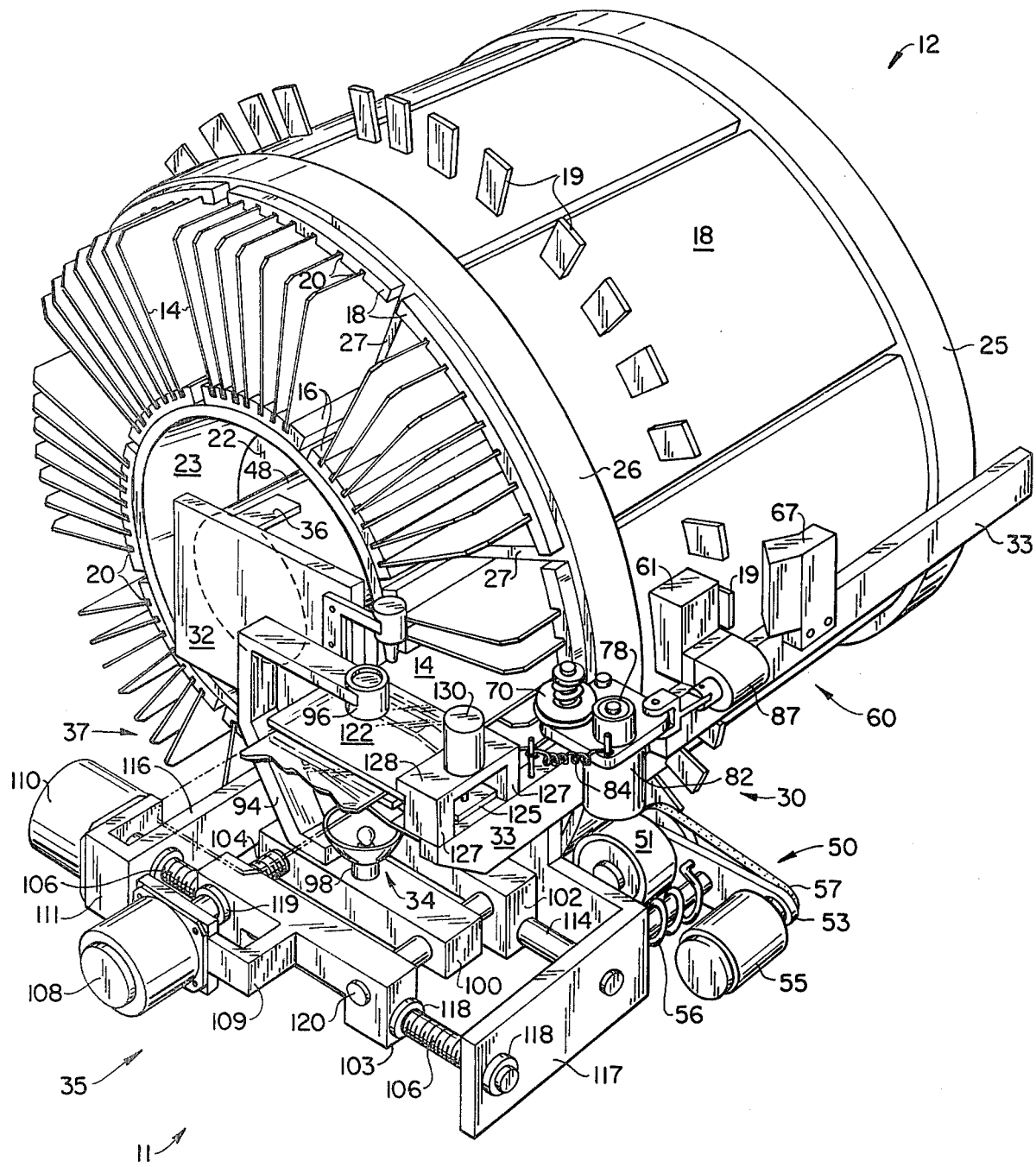
FIG._1.

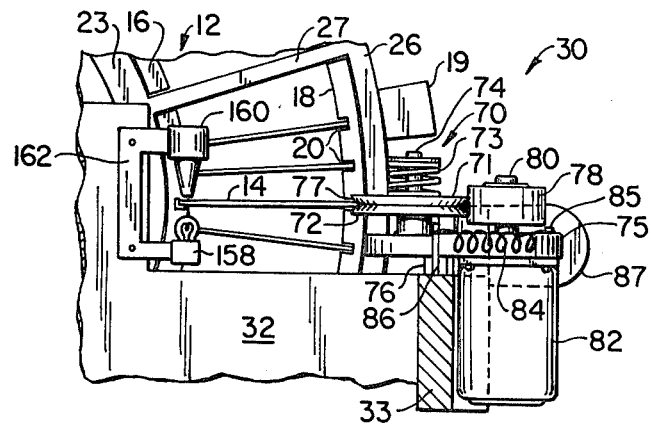
FIG._2.
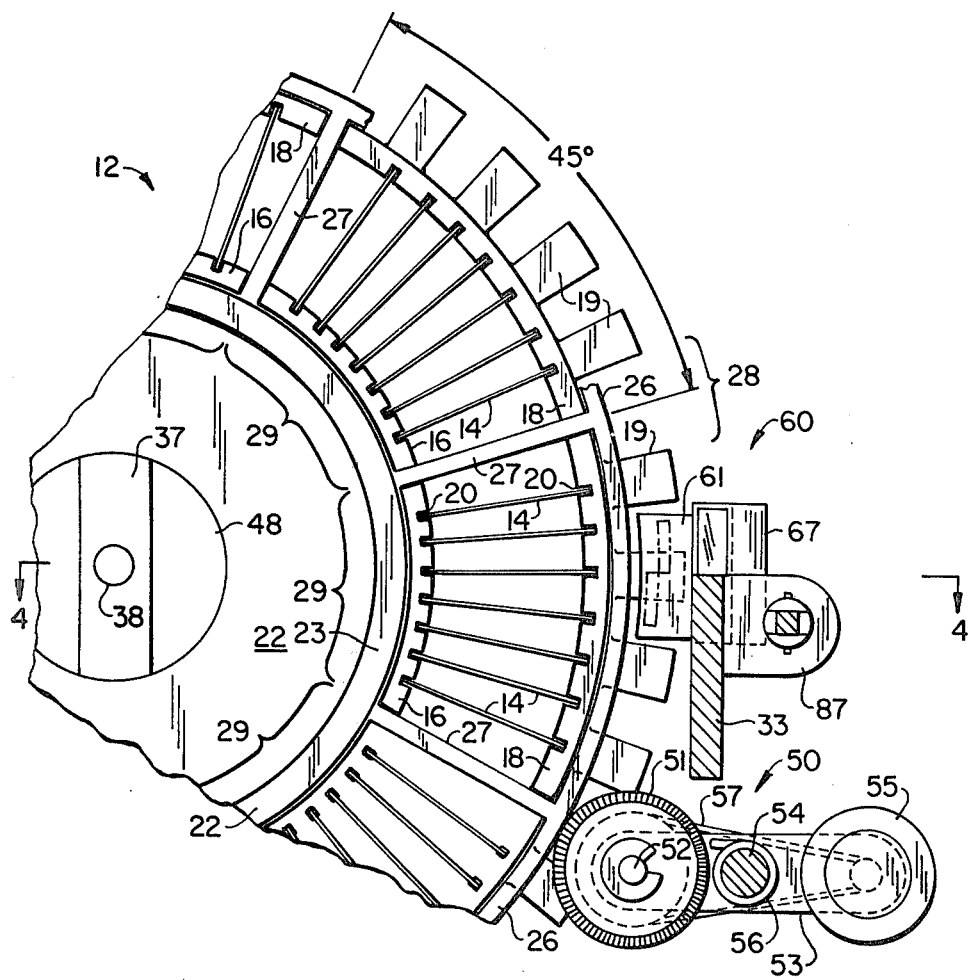
FIG._5.

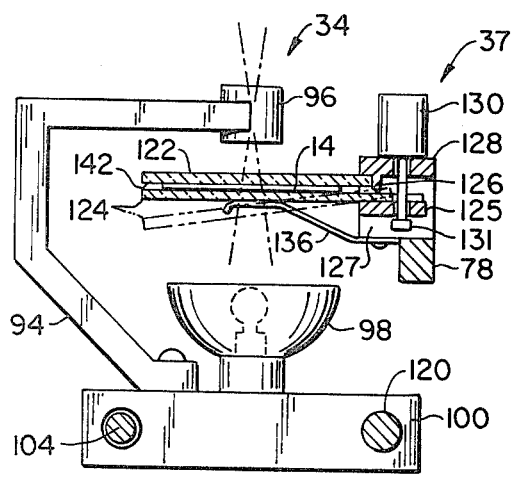
FIG._3.
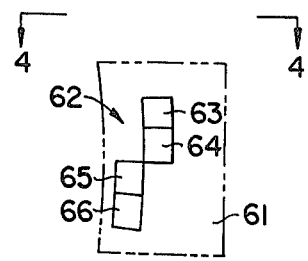
FIG._5a.
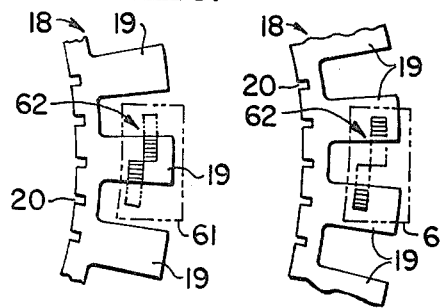
FIG._5b.  FIG._5c.  FIG._5d.
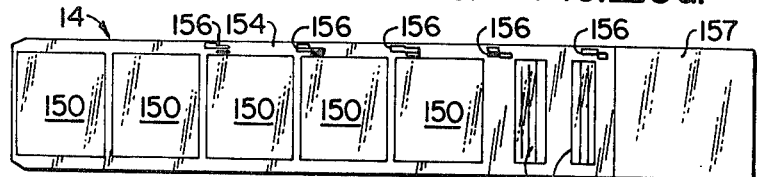
FIG._6.
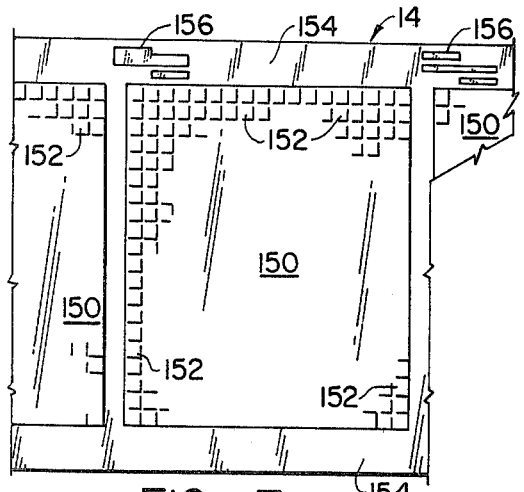
FIG._7.
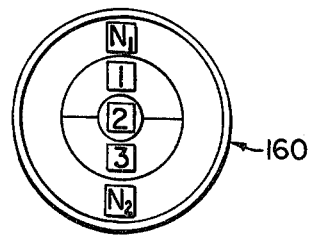
FIG._8.

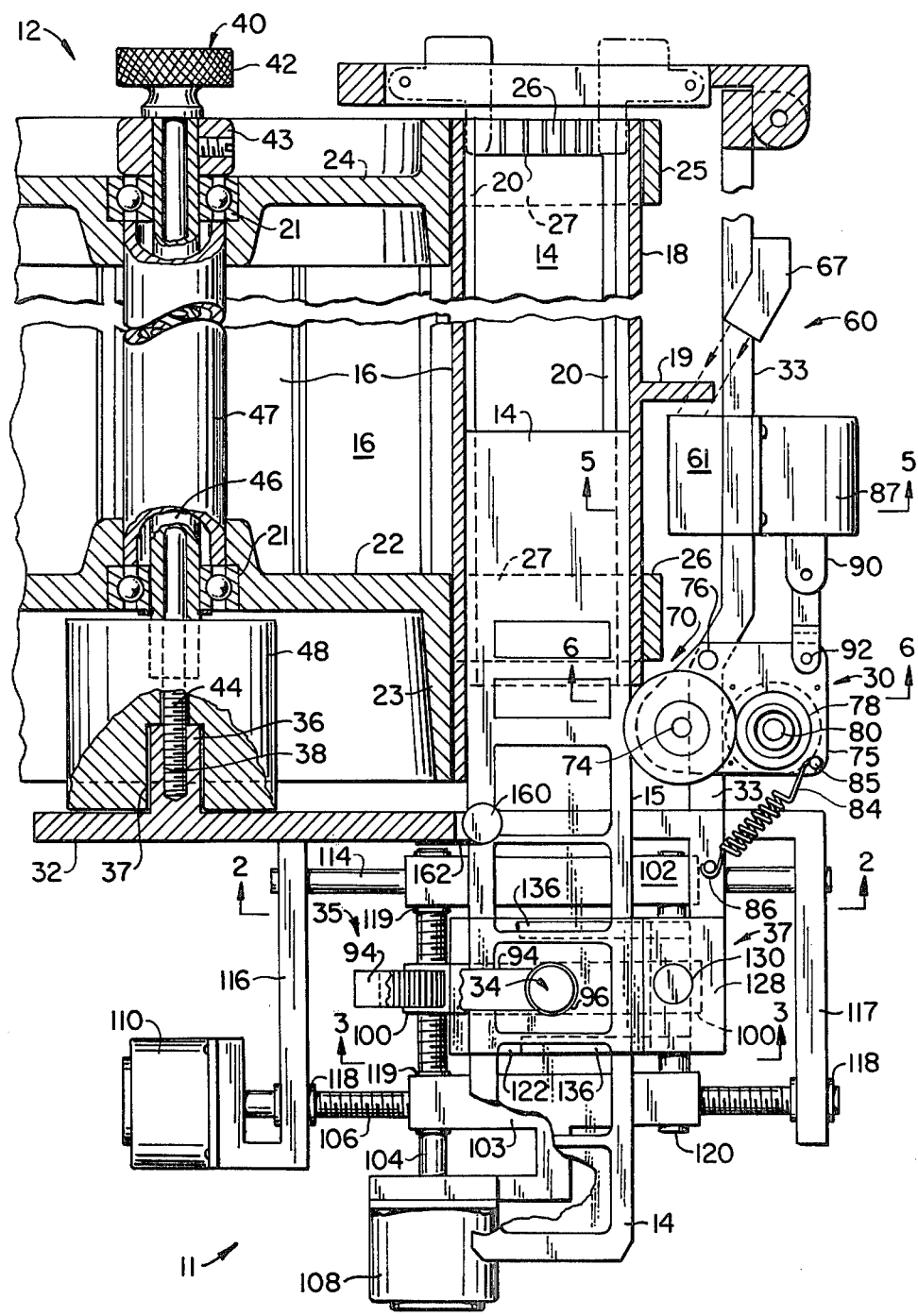
FIG._4.

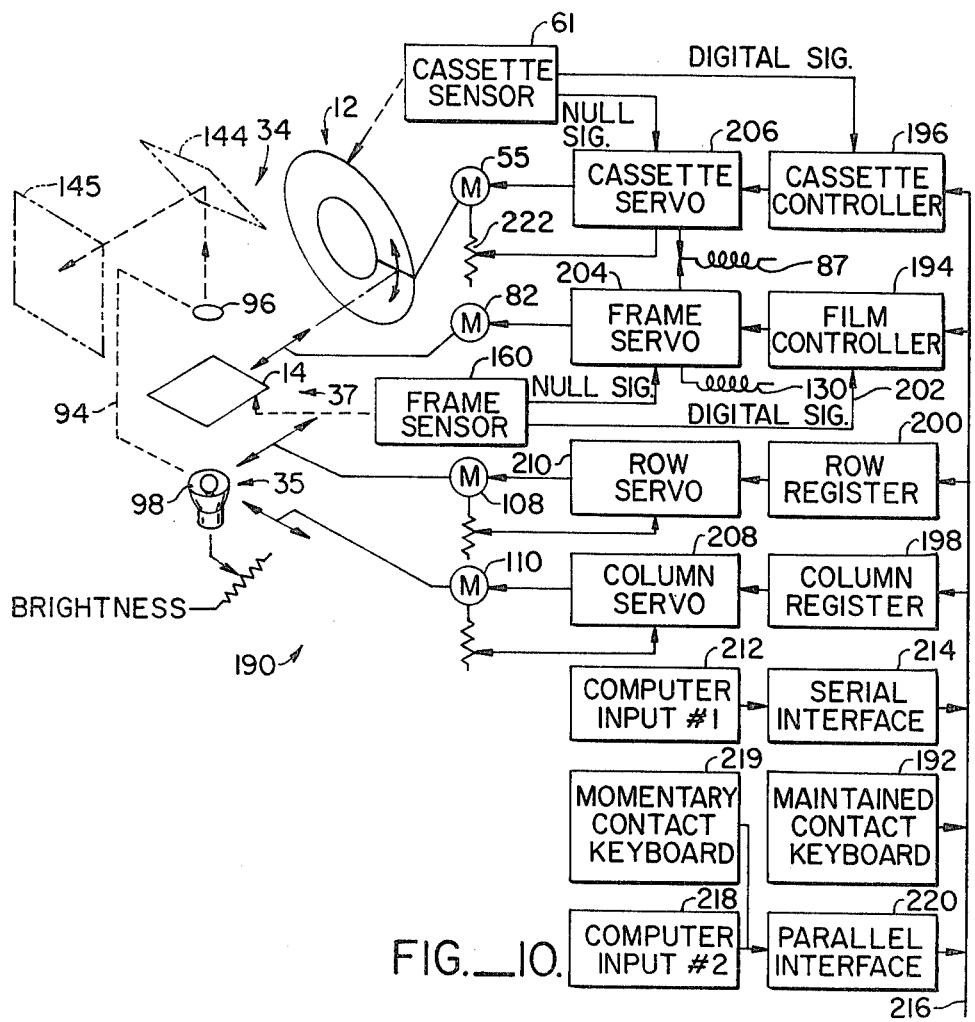

ROTARY FILM STRIP HOLDING APPARATUS

BACKGROUND OF THE INVENTION

Film strips having high reduction image frames of the order of 160X to 210X have been used to provide information storage in a compact form. Such a film strip has been disclosed in U.S. Pat. No. 3,743,400 which describes apparatus and method for handling such film strips. Because of the increased need to store more and more information, it is desirable to have as many film strips associated with a given apparatus as is practical to do so. The film strip holder of the present invention is limited to a minimal number of strips, such as up to 50. While this number of strips represents a relatively large number of image frames, it is extremely desirable that the film strip holder of such an apparatus be as large as possible so that as many film strips as practical can be provided for the apparatus. A need has, therefore, arisen for an improved film holder which is able to hold more film strips than is capable of being held with conventional holders, yet the film strips can be contained in the confined region without adding significantly to the cost of the apparatus.

SUMMARY OF THE INVENTION

The present invention is directed to an improved film strip holding apparatus which can be used with film strips of the type mentioned in the above patent, wherein the apparatus of this invention includes a rotary film strip holder or cassette comprised of a group of cylindrical segments arranged to form two concentric cylindrical members with the inner member having grooves on its outer periphery and the outer member having grooves on its inner periphery, each groove on the inner member being aligned with a respective groove on the outer member so that each pair of inner and outer grooves can removably receive the opposed side edges of a respective film strip. The film strips are, therefore, movable relative to the cassetter, and a relatively large number of strips can be placed in the cassette while the diameter of the cassette is kept within usable limits.

The cassette has a central axle rotatably mounted in cantilever fashion on a projection extending laterally from a base plate forming a part of a stationary support. The outer periphery of the cassette is engaged by a drive wheel and the drive wheel is rotated by a reversible motor also carried by the support so as to impart rotation to the cassette itself, whereby a selected one of a number of film strips carried in the cassette can be moved into an operative position adjacent to an edge drive wheel movable laterally back and forth and into and out of engagement with a portion of the side edge of the selected film strip aligned therewith. To permit driving engagement of the edge drive wheel with the film strip, the inner cylindrical member of the cassette is made longer than the outer member to present an annular recess extending about the cassette in alignment with the edge drive wheel.

Timing means in the form of spaced, rectangular pickets or tabs is carried on the outer periphery of the outer cylindrical member, the tabs being operable to successively intercept a light beam from a fixed source at the side of the cassette for generating signals used to operate the motor which rotates the cassette. Such signals alternately energize a counter device coupled with the drive motor and with the edge drive wheel mounting means, all of which is under the control of control means having data input means coupled therewith, so that the user of the apparatus can enter the desired information into the system to cause rotation of the cassette until the desired film strip is presented to the edge drive wheel.

The apparatus operates to move the selected film strip partially out of the cassette and into coupled relationship with the film strip hold-down structure and the optical system of the apparatus, whereby a desired image on the film strip can be illuminated and projected onto a screen for viewing. Following this, the film strip can be returned to the cassette and the cassette can then be rotated to position a newly selected film strip in alignment with the edge drive motor and the above steps are then repeated.

The primary object of this invention is to provide an improved film strip holding apparatus for use with an optical system, wherein the apparatus has a cylindrical cassette which holds a relatively large number of film strips in positions radially spaced about a central axis, whereby the cassette and film strips can be rotated about the axis as a unit until a desired film strip is aligned with an edge drive wheel, whereupon the desired film strip can be partially moved out of the cassette by the frictional engagement with the wheel, and the desired film strip will be moved into coupled relationship with the optical system so that a particular image on the film strip can be illuminated, projected and viewed before the film strip is returned to the cassette.

Another object of this invention is to provide an apparatus and method for holding a plurality of film strips in a circular pattern about a central axis and for moving a selected one of the film strips out to the pattern and into coupled relationship with an optical system associated therewith so that a greater number of film strips can be available for use with the optical system than has heretofore been possible with conventional film strip holding devices.

Other objects of this invention will become apparent as the following specification progresses, reference being had to the accompanying drawing for an illustration of a preferred embodiment of the invention. IN THE DRAWINGS:

FIG. 1 is a perspective view of the film strip handling and reading apparatus of this invention showing one of a plurality of film strips partially removed from a cylindrical cassette and in position to be read by the optical system of the apparatus;

FIG. 2 is a fragmentary, front elevation view of the means for moving a film strip into and out of the cassette;

FIG. 3 is a fragmentary, front elevation view of a hold-down means for releasably maintaining a film strip in a fixed position with respect to the shiftable optical system of the apparatus;

FIG. 4 is a sectional plan view of the cassette and the film handling and reading apparatus with the view being taken coplanar with the rotational axis of the cassette;

FIG. 5 is a fragmentary, front elevation view of the cassette and its drive and rotational sensing control features;

FIGS. 5a, 5b, 5c and 5d are fragmentary, front elevation views showing the photo-electric cells of the cassette rotation sensor;

FIG. 6 is an enlarged, top plan view of a film strip removed from the cassette;

FIG. 7 is an enlarged, fragmentary, top plan view of the film strip showing one segment thereof and the plurality of image frames for the segment;

FIG. 8 is an enlarged, schematic, top plan view of the means, for sensing indicia on a film strip, showing the relative positions of a number of light sensing devices;

FIG. 9 is a graphic view in tabular form of the coding system used on each film strip; and FIG. 10 is a block diagram of the control means for the various motors and solenoids of the apparatus.

The film strip handling and reading apparatus of this invention is broadly denoted by the numeral 11 and includes a rotatable, cylindrical cassette 12 (FIGS. 1, 2, 4 and 5) carrying a number of film strips 14 (FIG. 6) in surrounding relationship to the central axis of the cassette. The cassette is removably and rotatably mounted on a stationary support which includes a plate 32 and an extension 33 attached to plate 32, the mounting being such as to permit the cassette to rotate about a generally horizontal axis parallel to the sides of the film strips carried by the cassette. The cassette, in operation, is rotated to bring a selected one of the film strips into a specific position from which it is partially removed from the cassette and directed to a reading station near an optical system of the apparatus for readout of the information on a particular image frame of the film strip, following which the film strip can be returned to the cassette and the cassette is again rotated so that another selected film strip can be brought into the specific position and partially removed for information readout purposes. The way in which the foregoing occurs and the way in which the information is located on each film strip will be set forth hereinafter.

Cassette 12 (FIGS. 1, 2, 4, 5 and 10) consists of front disk 22 (FIGS. 1 and 5) and rear disk 24 (FIG. 4) mounted on front and rear bearings 21 (FIG. 4) which permit the cassette to rotate relative to and around axle 46 through which passes a bolt 44 (FIG. 4) that attaches hub 48 to boss 36 of the main plate 32. A sleeve 47, through which passes axle 46, connects disk 22 to disk 24 to maintain their axial spacing and cause them to rotate around axle 46 as a unit. Webs 27 (FIGS. 1 and 5) extend radially outwardly from disks 22 and 24 and support rear hoop (FIG. 1) and front hoop 26.

A plurality of pairs of opposed cylindrical segments 16 and 18 are disposed around the inner and outer peripheries, respectively, of cassette 12 to form two coaxial cylinders. The innermost cylinder, attached to the outer peripheries of disks 22 and 24, is formed of a plurality of inner segments 16 (FIG. 5) each having on its convex outer surface a series of parallel, longitudinally extending grooves 20 (FIG. 5) for receiving radially innermost side margins of film strips 14. The outermost cylinder, attached to the inner surfaces of hoops 25 and 26, is formed of a plurality of outer segments 18 each of which, on its concave inner surface, has a series of parallel, longitudinally extending grooves 20 (FIG. 5) for receiving the radially outermost side margins of film strips 14. Segments 18 not only have the same number of grooves 20 as do segments 16, but opposing grooves 20 are located in radially opposed pairs that will cause any film strip 14 held in a given pair of grooves 20 to have its major surface radial relative to the central axis of the cassette. Additionally, segments 18 have on their convex outer surfaces a series of spaced radial projections or pickets 19 (FIGS. 1 and 5) located in such a manner as to cause them to pass successively between cassette photo-electric sensor 61 (FIG. 1) and light source 67 when the cassette is rotated. The pickets are used to move a selected film strip in a position (FIG. 2) from which the film strip is partially removed from the cassette so that information from one of the image frames on the cassette can be read out by the optical system of apparatus 11.

The photo-electric cells in sensor 61 (FIG. 5a) include an inner pair 65 and 66 and an outer pair 63 and 64. These photocells develop signals from the light received thereby and the signals are sent to drive motor 55 (FIGS. 1 and 5) to cause the latter to rotate drive wheel 51 in engagement with front hoop 26 until a single picket 19 is exactly centered in the photocell array 62 (FIG. 5b), or until the space between adjacent pickets is exactly centered in the photocell array 62 (FIG. 5c) depending upon the address of the selected film strip. Alternate pairs of grooves 20 are in radial alignment with respective pickets 19, and the other pairs of grooves are radially aligned with respective gaps between pickets (FIGS. 5, 5b and 5c). If the gap between pickets is too large for the sensor to develop the proper signal, reversible drive motor 55 is kept energized until the next proper signal is detected. This prevents the cassette from stopping where webs 27 separate the segments (FIG. 5d).

The back of cassette adjacent to hoop 25 is open to permit the film strips to be inserted therein. Film holding segments 18 are shorter in axial length (FIG. 4) than segments 16 thereby exposing a portion of the radially outer edge 15 of each film strip 14 near its front end for engagement by film drive means 30 (FIG. 4) to be described.

Apparatus 11 has base plate 32 (FIG. 4) normal to the axis of cassette 12, and an extension 33 (FIG. 1) coupled with base plate 32 is parallel to the central axis of the cassette. A shiftably mounted optical system 34 is adjacent to one side of base plate 32 for reading the information on an image frame of a selected film strip 14 aligned therewith. An X-Y translation mechanism 35 (FIGS. 1 and 5) is also carried on base plate 32 and is operable to move the optical system 34 relative to a stationary film strip hold-down means 37 (FIG. 3).

Mounting boss 36 (FIG. 4) is on the side of base plate 32 opposite from hold-down means 37. Boss 36 is preferably rectangular and is operable to locate the cassette adjacent to the film edge drive means 30. Apparatus 11 can be mounted in a housing (not shown) having a closable opening (not shown) through which the cassette can be moved as it is directed into coupled relationship with boss 36 for cantilever support thereby.

Boss 36 includes a threaded hole 38 (FIG. 4) operable to receive cassette bolt 44 extending through axle 46 to urge cassette hub 48 into proper alignment with boss 36. A knurled head 42 on bolt 44 is used to rotate the bolt. In this way, the operative position of the cassette is determined so that film edge drive means 30 will be properly aligned with the exposed outer edge 15 of a selected film strip 14.

Drive mechanism 50 is attached through support rod 54 (FIGS. 1 and 5) to base plate 32. The drive wheel 51 is in frictional engagement with hoop 26 and is operable to rotate the cassette in either a clockwise or counterclockwise manner to position selected film strip adjacent to and aligned with both the film drive means 30 (FIGS. 1, 2 and 4) and the hold-down means 37 (FIGS. 1 and 3). Drive wheel 51 is biased against hoop 26 of cassette 12 by spring 56 which, at its extremities, engages in holes in base plate 32 and drive arm 53, respectively. At the end of drive arm 53, opposite from drive wheel 51, is located reversible drive motor 55 which is coupled to drive wheel 51 by an endless, flexible belt 57.

Whenever the cassette 12 is removed from or inserted onto boss 36 (FIG. 4), the drive wheel end of the cassette drive means 50 must be withdrawn manually from contact with the cassette. This can be done also by connecting the drive means to the housing door in such a way as to accomplish this withdrawal automatically whenever the door is opened.

Film drive means 30 (FIGS. 1 2 and 4) includes a wheel 70 defined by a pair of disks 71 and 72 (FIG. 2) which are in abutment with each other but are separable from each other. The disks have sloping, outer peripheral margins which cooperate to form a substantially V-shaped outer periphery 77. The disks are mounted on shaft 74 carried by arm 75 (FIG. 4) pivotally mounted on pin 76 secured to base plate extension 33. Disk 72 of wheel 70 is rigid to shaft 76 and disk 71 is shiftable axially on shaft 76. Coil spring 73 surrounding shaft 76 biases disk 72 into engagement with disk 71.

Wheel 70 is rotated by contact with pressure roller 78 (FIG. 1) mounted rigidly on shaft 80 of reversible motor 82 carried by and depending from arm 75. As motor 82 is energized, pressure roller 78 is rotated in a corresponding direction to, in turn, impart rotation to wheel 70 in the opposite direction. Other ways of making a driving connection between wheel 70 and motor 82 can be used, if desired.

Arm 75 is biased in a clockwise sense when viewing FIG. 4, by spring 84 (FIGS. 1 and 4) coupled at its ends to pin 85 on arm 75 and pin 86 on base plate extension 33. Thus, wheel 70 is biased into engagement with outer edge 15 of the adjacent film strip 14, the cassette having been positioned, by film drive means 50, in such a manner that, at all times, the selected film strip is aligned with the V-shaped outer periphery 77 of wheel 70. Since spring 84 biases the wheel into frictional or driving engagement with the adjacent film strip portion, the film strip can be moved either out of or back into the cassette depending on the rotational direction of motor shaft 80. Since upper disk 71 can move upwardly relative to lower disk 72, the adjacent film strip 15 can be slightly pinched between the disks to provide a more positive driving connection between the film strip and wheel 70.

A solenoid 87 (FIGS. 1 and 4) carried on base plate extension 33 has an armature 90 pivotally connected by pin 92 (FIG. 4) to arm 75. Thus, when the solenoid is energized, arm 75 is rotated in a counterclockwise sense when viewing FIG. 4 about pin 76 against the bias force of spring 84. This causes wheel 70 to move out of engagement with the adjacent film strip edge 15, thereby permitting cassette 12 to be removed, or to be rotated under the influence of cassette drive means 50. When solenoid 87 is de-energized, wheel 70 moves back into engagement with the adjacent film strip edge 15. Then, motor 82 (FIG. 2) can be energized to move the film strip 14 partially out of the cassette 12.

Translation mechanism 35 (FIGS. 1 and 4) for moving the optical system 34 includes a vertically disposed yoke 94 (FIGS. 1, 2, 3 and 10) on which optical system 34 is mounted, system 34 including lens assembly 96 at the upper end of the yoke and light source 98 at the lower end thereof. The yoke is movable in an X-Y plane relative to the base plate 32, and the yoke shifts relative to the base plate while the lens assembly 96 remains an equal distance from the focal plane 142 (FIG. 2) of the film hold-down means 37. Yoke 94 has a lower extension 100 mounted between and movable toward or away from followers 102 and 103 (FIG. 1) which are shiftably mounted relative to spaced arms 116 and 117 (FIG. 1), the latter being rigid extensions of base plate 32 and parallel to the axis of cassette 12. Followers 102 and 103 are coupled to respective, mutually perpendicular worms 104 and 106 (FIGS. 1 and 4). The worms are driven by respective reversible drive motors 108 and 110. Worm 104 is out of the plane of worm 106 and is carried by bushings 119 in followers 102 and 103. The opposite ends of followers 102 and 103 and of yoke extension 100 are supported by rod 120 which is substantially coplanar with parallel worm 104.

Worm 106 is supported by bushings 118 in arms 116 and 117 and drives a worm-follower (not shown) located in bosses on the underside of follower 103 to shift follower 103 between arms 116 and 117. Follower 102 is supported by rod 114 which is supported at its ends by arms 116 and 117 and is substantially coplanar with and parallel to worm 106. Thus, yoke 94, extension 100, followers 102 and 103, and motor 108 can move together in opposed directions between arms 116 and 117 under the influence of motor 110. The yoke can also be moved in a direction parallel with the axis of cassette 12 relative to and between followers 102 and 103 under the influence of motor 108. In this way, optical system 34 can move in the X-Y plane defined by a plane parallel to, but below, the focal plane 142 (FIG. 3) of optical system 34 which is the lower surface of window 122 of the hold-down means 37 (FIG. 3), it being understood that both motors 108 and 110 can be in operation at the same time to effect diagonal translation of the optical system.

Light source 98 (FIG. 3) of optical system 34 is vertically aligned with and below lens assembly 96 to direct light through hold-down means 37 to lens assembly 96. Means 37 includes a pair of transparent windows 122 and 124, window 124 being below window 122 and pivotally mounted (FIG. 3) below bracket 128 and between extensions 127 (FIG. 1) of said bracket, and bracket 128 is mounted on base plate extension 33. Window 124 is biased upwardly by leaf springs 136, on opposed sides of the image area, and window extension 125 is engaged with armature 131 of solenoid 130, with the leaf springs being attached to the lower surface of bracket extensions 127.

When solenoid 130 is energized, window extension 125 is drawn upwardly causing window 124 to pivot as it contacts pivot 126 of bracket 128, thus forcing window 124 downwardly against the upward bias of springs 136 and releasing a film strip 14 from confinement between windows 122 and 124. When film strip 14 has been partially moved out of cassette 12 to position a selected segment 150 (FIG. 7) in the hold-down means 37, solenoid 130 is de-energized and springs 136 urge window 124 upwardly forcing film strip 14 against the bottom surface 142 of window 122, which is the focal plane of lens 96, for readout of information contained therein.

When light passes from source 98 through windows 122 and 124, and film strip 14, it emerges from the upper window, passes through lens assembly 96, and than can be directed to a viewing screen 145 (FIG. 10) by prisms or mirrors depicted as 144. Window 124 protects the film strip thereabove from the heat of light source 98.

Each film strip 14 has a number of segments 150 (FIG. 6) along the length thereof with each segment having a plurality of image frames 152 (FIG. 7). For purposes of illustration, there are five segments and 420 frames in each segment. Other arrangements of the segments and frames can be utilized as desired. Each film strip 14 has a side margin 154 provided with a coding system for segments 150 there being a code area 156 for each segment, respectively. As shown in FIG. 6, such code areas 156 are staggered with respect to the corresponding segments 150 and are spaced apart by a distance equal to the spacing between corresponding segments.

A code reading device is carried by base plate 32 and includes a light source 158 (FIG. 2) and a light sensor 160 having five photocells (FIG. 8) for sensing respective bands of information on each code area 156. A bracket 162 (FIG. 2) mounts sensor 160 so that its lower end is alinged with and directly above the region through which margin 154 of a film strip passes when the latter moves outwardly of cassette 12 toward hold-down means 37. The arrangement of the five photocells in sensor 160 is shown in FIG. 8, the photocells being denoted by N1,1,2,3, and N2.

Each code area 156 has a pair of outer bands 172 and 174 (FIG. 9) which are sensed by photocells N1 and N2. These photocells develop signals sent to motor 82 to cause the latter to rotate wheel 70 until a preselected segment 150 is properly positioned with respect to optical system 34. This position is determined by a null point and such null point is reached when photocell N1 senses the right end of band 172 (FIG. 9) and when photocell N2 senses the left end of band 174. The space between outer bands 172 and 174 of each code area 156 can be provided with any combination of three inner bands, such as in binary form. FIG. 9 shows in tabular form the arrangements of such bands which present binary numbers 1 through 5 for the five code areas 156.

Photocells 1, 2 and 3 between photocells N1 and N2 (FIG. 8) sense respective inner bands 176, 178 and 180 of a corresponding code area 156. They operate to develop signals which are to be compared with a specific input signal to effect operation of drive motor 82 until a desired segment 150 is between windows 122 and 124, at which time motor 82 is stopped.

The control system 190 of apparatus 11 is shown in FIG. 10, the various drive motors, a film strip, and the optical system being shown schematically while the electronics for operating the motors are shown in block form. Control system 190 includes an input device 192, such as a keyboard, which directs input signals to a film controller 194, a cassette controller 196, a column register 198 and a row register 200. Film controller 194 is directed to a servo 204 which effects operation of motor 82, the latter being operable to rotate wheel 70 to advance or retract a film strip 14 with respect to cassette 12. A film strip is only partially removed from cassette 12, at least a portion 157 (FIG. 6) of the film strip always remaining in the cassette.

Solenoids 87 and 130 are coupled with frame servo 204 in a manner to enable the same to effect operation of motor 82 when solenoid 130 is energized to move window into the dashed-line position (FIG. 3) while solenoid 87 is de-energized to allow wheel 70 to engage film strip edge of the selected film strip 14 and complete frame selection by moving the selected film strip under the influence of motor 82 and frame sensor 160 (FIGS. 1, 2 and 4). Additionally, solenoid 87 is coupled to cassette servo 206 to enable the latter to energize solenoid 87 and thus disengage wheel 70 from film strip portion 15 prior to rotation of cassette 12 by motor 55, and keep wheel 70 disengaged from the film strip edge 15 until motor 55 is de-energized. Thus, a film strip can move uninterruptedly either out of or into the cassette, and can be rotated without interference with or damage to the exposed film strip portions 15.

Cassette controller 196 controls a cassette servo 206 which, in turn, effects operation of motor 55. Column register 198 controls a column servo 208 to, in turn, effect operation of motor 110; and row register 200 controls a row servo 210 which effects operation of motor 108.

Input device 192, as illustrated in FIG. 10, is a maintained contact keyboard, In lieu of this type of input, a computer input unit 212 can be used to supply the input signal. For purposes of illustration, unit 212 is of the type which is used with serial interface means 214 to supply a signal to the signal input line 216. Alternatively, another computer input unit 218 operated by a monentary contact keyboard 219 can be used with parallel interface means 220 to provide a second type of input signal to line 216.

Each of motors 55, 108 and 110 has a potentionmeter associated with it for developing a feedback signal which is compared with an input signal to derive the appropriate output signal to the motor. For instance, a comparator is associated with cassette servo 206 to compare the input signal thereto from input device 192 with the feedback signal from the corresponding potentiometer 222.

OPERATION

Apparatus 11 is placed into use by first inserting cassette 12 into abutment with mounting boss 36 by tightening the threaded engagement of bolt 44 and threaded hole 38 through the operation of knurled knob 42 (FIG. 4) until an innermost stop is reached. After manually energizing solenoid 87 to disengage drive wheel 70, the cassette is then manually rotated to a zero index position, and solenoid 87 is then de-energerized.

Control unit 190 (FIG. 10) coupled with the various drive motors and solenoids is then operated by manually punching in the digits of the input signal on keyboard device 192. This causes solenoid 87 to be energized to urge wheel 70 away from the cassette. Motor 55 is then energized to rotate the cassette by means of drive wheel 51. When the cassette has turned to a location at which the desired film strip is aligned with the hold-down means 37, motor 55 is deenergized, following which solenoid 87 is deenergized and spring 84 returns wheel 70 to its operative position in driving engagement with exposed edge 15 of the desired film strip 14 that has been aligned therewith. Solenoid 130 is actuated to move window 124 away from window 122 before motor 82 is energized to move the film strip out of the cassette. As the film strip passes below frame sensor 160, code areas 156 thereon are read by the sensor, receiving light from source 158, until the desired code has been received, whereupon motor 82 is deactuated stopping the film at the desired frame. While the foregoing is occurring, motors 108 and 110 are actuated to move yoke 94 in the proper direction to align the optical path of lens assembly 96 and source 98 with the preselected region which the desired frame will occupy when the film stops. In this way, the optical system itself moves relative to the film strip to the desired row and column coordinates of the frame automatically, notwithstanding the relatively large number of frames on each frame.

When the film strip has stopped, solenoid 130 is deactuated to cause window 124 to force the film stip into engagement with the lower, optically flat surface 142 of window 122. Light from source 98 is then projected through the preselected address and the image of the data thereat is projected by lens assembly 96 onto a viewing screen 145 through the use of conventional prisms or mirrors, whereby the image of the data may be seen at a greatly magnified scale, the magnification being of the order of 175 to 200 times.

When it is desired to view another frame in the same film segment, only the translation means 35 is actuated to move the optical system 34 because all manual selection data inputs to control unit 140 which duplicates the previous selection are nullified, and only those functions are actuated by the second input which are required to effect those parts of it which differ from the first input. If it is desired to view part of another segment of the same film strip, solenoid 130 is actuated to free the film strip from frictional contact with windows 122 and 124. Then, motor 82 is actuated to reposition the film strip, and motors 108 and 110 are actuated to reposition the optical system. When the film stops, solenoid 130 is deactivated, the film strip is returned to the focal plane and the information read out as before. However, should the next desired frame be located on a different film strip in the same cassette, the entire cycle of operations must be effected, i.e., activate solenoid 130 to free the film from the hold-down means 37, actuate motor 82 to return film strip to cassette, de-energize motor 82 and energize solenoid 87 to disengage wheel 70 from the exposed edge 15 of the film strip, and activate motor 55 to rotate cassette 12 and bring the desired film strip into position. The cassette controller will determine whether clockwise or counterclockwise rotation of the cassette is the shortest route to the desired film strip.

If it is desired to change cassettes, it is manually removed through opening 38 (not shown) after disengageing wheel 170 and bolt 44 and a different cassette installed as previously described. If, perchance, one cassette will not hold all the data required of a particular, continuous readout operation, the control unit 180 can automatically bring into operation one or more additional film strip handling and reading units whose total data capacity approaches infinity.

We claim:

1. Film strip holding apparatus comprising: a cassette having means defining a pair of generally concentric, cylindrical members, the outer periphery of the inner member and the inner periphery of the outer member having a plurality of grooves formed therein, there being a groove on one member radially aligned with a groove on the other member, respectively, aligned pairs of grooves adapted to receive the side edges of respective film strips to permit the film strips to move partially out of and to return to the cassette; means coupled with the cassette for rotating the same about its central axis, the cassette having a side recess for exposing the outer side edge of each film strip when the same is aligned with a predetermined reference point; a rotary drive wheel adjacent to one side of the cassette; means mounting the drive wheel for movement into and out of driving engagement with a side edge of a film strip aligned therewith; a reversible motor coupled with said drive wheel for rotating the same in opposed directions; and means responsive to the rotation of the cassette for selectively positioning a film strip adjacent to the wheel.

2. Film strip holding apparatus as set forth in claim 1, wherein is included a plurality of radially extending circumferentially spaced webs spanning the distance between the inner and outer members.

3. Film strip holding apparatus as set forth in claim 1, wherein the axial length of the inner member is greater than the axial length of the outer member to define said side recess.

4. Film strip holding apparatus as set forth in claim 1, wherein said positioning means includes a light source, a light pick-up means aligned with the light source for generating signals in response to the light received thereby, and timing means carried by the cassette for successively interrupting the light beam as a function of the rotation of the cassette relative thereto.

5. Film strip holding apparatus as set forth in claim 1, wherein each of said inner and outer members includes a number of spaced segments, each segment having a cylindrical surface provided with respective grooves, and means coupled with the members for connecting them together to form respective cylindrical members.

6. Film strip holding apparatus as set forth in claim 1, wherein is included a support, said cassette having a central axle, said axle being rotatably mounted in cantilever fashion on the support.

7. Film strip apparatus as set forth in claim 1, wherein is included a film strip hold-down device aligned with a predetermined radial location on said cassette, a shiftable optical system adjacent to said hold-down device, and means coupled with said optical system for shifting the same in an X-Y plane relative to said hold-down device.

8. Film strip holding and reading apparatus comprising: a support; a cassette having means defining a pair of generally concentric, cylindrical members, the outer periphery of the inner member and the inner periphery of the outer member having a plurality of grooves formed therein, there being a groove on one member radially aligned with a groove on the other member, respectively, aligned pairs of grooves adapted to receive the side edges of respective film strips to permit the film strips to move partially out of and to return to the cassette; means coupled with the support for rotatably mounting the cassette thereon to permit a selected one of a number of film strips carried by the cassette to move into and out of a predetermined reference position relative to the support; means engageable with the cassette for rotating the same about its central axis, the cassette having a side recess for exposing the outer side edge of a film strip aligned with said reference position; a rotary drive wheel adjacent to said reference position for movement into and out of driving engagement with the adjacent side edge of the film strip in said reference position; a reversible drive motor coupled with said drive wheel for rotating the same in opposed directions; means defining a light source for generating signals in response to the light received thereby, timing means carried by the cassette for successively interrupting the light beam from the light source as a function of the rotation of the cassette relative to the support; a film strip hold-down device aligned with said reference position for releasably holding a film strip in a predetermined plane when the film strip extends partially out of the cassette and when the film strip is in said reference position; an optical system adjacent to said hold-down device; means coupled with said optical system for selectively shifting the same in an X-Y plane relative to the support; and control means for controlling the actuation of said cassette rotating means, the drive motor, the signal generating means, the hold-down device, and said shifting means for said optical system.

9. Film strip holding apparatus as set forth in claim 8, wherein the axial length of the inner member is greater than the axial length of the outer member to define said side recess.

10. Film strip holding apparatus as set forth in claim 8, wherein each of said inner and outer members includes a number of spaced segments, each segment having a cylindrical surface provided with respective grooves, and means coupled with the members for connecting them together to form respective members.

11. Film strip holding apparatus as set forth in claim 8, wherein said timing means includes a plurality of circumferentially spaced tabs secured to the outer member and extending radially outwardly therefrom.

12. Film strip holding apparatus as set forth in claim 8, wherein is included a support, said cassette having a central axle, said axle being rotatably mounted in cantilever fashion on the support.

13. Film strip holding apparatus as set forth in claim 12, wherein said support has a projection, said axle having a hub provided with an end recess for receiving the projection, and bolt extending through the axle and releasably coupled to the projection, said axle having a pair of spaced bearings for rotatably mounting the cassette thereon.

14. A method of retrieving recorded information comprising: placing a plurality of film strips in a rotatable, circular array with each film strip having a number of segments in end-to-end relationship and with each segment having a plurality of image frames thereon; selecting a film strip; rotating the array; positioning the selected film strip in a predetermined reference position as a function of the rotation of the array; selecting a segment and an image frame on the selected film strip; applying a force exerted in one direction to a side edge of the selected film strip to move the same in said one direction along a predetermined path only partially out of said array and toward a fixed locaiton spaced therefrom; sensing indicia on the film strip as the latter moves along said path; stopping the movement of the film strip when the selected segment is aligned with said fixed location in response to the sensing of the indicia corresponding to the selected segment; moving an optical path into alignment with the region to be occupied by the selected image frame onto a viewing screen; applying a force exerted in the opposite direction to a side edge of the film strip to move the film strip relative to said fixed location in the opposite direction to thereby return it to said array; selecting a second film strip; rotating the array; positioning the second selected film strip in said reference position as a function of the rotation of the array; and repeating the segment selecting, first force applying, indicia sensing, stopping, optical path moving, projecting and second force applying steps.

15. Film strip holding apparatus comprising: a cassette having means defining a pair of generally concentric, cylindrical members, the outer periphery of the inner member and the inner periphery of the outer member having a plurality of grooves formed therein, there being a groove on one member radially aligned with a groove on the other member, respectively, aligned parts of grooves adapted to receive the side edges of respective film strips to permit the film strips to move partially out of and to return to the cassette; means coupled with the cassette for rotating the same about its central axis, the cassette having a side recess for exposing the outer side edge of each film strip when the same is aligned with a predetermined reference point; means defining a light source; a light pick-up means aligned with the light source for generating signals in response to the light received thereby; and a plurality of circumferentially spaced tabs secured to the outer member and extending radially outwardly therefrom, said tabs being operable for successively interrupting the light beam as a function of the rotation of the cassette relative thereto.

16. Film strip holding apparatus comprising: a cassette having means defining a pair of generally concentric, cylindrical members, the outer periphery of the inner member and the inner periphery of the outer member having a plurality of grooves formed therein, there being a groove on one member radially aligned with a groove on the other member, respectively, aligned pairs of grooves adapted to receive the side edges of respective film strips to permit the film strips to move partially out of and to return to the cassette; means coupled with the cassette for rotating the same about its central axis, the cassette having a side recess for exposing the outer side edge of each film strip when the same is aligned with a predetermined reference point; a support, said cassette having a central axle, said axle being rotatably mounted in cantilever fashion on the support, said support having a projection, said axle having a hub provided with an end recess for receiving the projection; and a bolt extending through the axle and releasably coupled to the projection, said axle having a pair of spaced bearings for rotatably mounting the cassette thereon.

* * * * *